US012766892B2

(12) United States Patent
Chang et al.

(10) Patent No.: US 12,766,892 B2
(45) Date of Patent: Oct. 20, 2026

(54) POSITIONING SYSTEM AND POSITIONING METHOD OF TIRE PRESSURE SENSOR AND VEHICLE

(71) Applicant: FOXCONN INTERCONNECT TECHNOLOGY LIMITED, Grand Cayman (KY)

(72) Inventors: Tang-Yun Chang, New Taipei (TW); An-Yao Lee, New Taipei (TW); Yun-Rong Song, New Taipei (TW)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 14 days.

(21) Appl. No.: 18/807,046

(22) Filed: Aug. 16, 2024

(65) Prior Publication Data

US 2025/0242640 A1 Jul. 31, 2025

(30) Foreign Application Priority Data

Jan. 31, 2024 (CN) ......................... 202410139580.6

(51) Int. Cl.
*B60C 23/04* (2006.01)

(52) U.S. Cl.
CPC ...... *B60C 23/0416* (2013.01); *B60C 23/0433* (2013.01)

(58) Field of Classification Search
CPC ........................ B60C 23/0416; B60C 23/0433
USPC .......................................................... 340/447
See application file for complete search history.

(56) References Cited

U.S. PATENT DOCUMENTS

| | | | | |
|---|---|---|---|---|
| 9,950,577 B1 * | 4/2018 | Marlett | H04L 63/0876 | |
| 10,093,138 B2 * | 10/2018 | DeCia | B60C 23/0416 | |
| 10,442,253 B2 * | 10/2019 | Werner | B60C 23/0408 | |
| 11,498,373 B2 * | 11/2022 | Adler | B60C 23/0444 | |
| 12,151,519 B2 * | 11/2024 | Fu | B60C 23/0437 | |
| 12,344,049 B2 * | 7/2025 | Singh | B60C 23/064 | |
| 2022/0332152 A1 * | 10/2022 | Fu | B60C 23/0444 | |
| 2023/0158842 A1 * | 5/2023 | Beaurepaire | G01C 21/3679 | 340/442 |

FOREIGN PATENT DOCUMENTS

| | | |
|---|---|---|
| CN | 106915210 A | 7/2017 |
| CN | 108422815 A | 8/2018 |
| CN | 114683779 A | 7/2022 |

* cited by examiner

*Primary Examiner* — Eric Blount
(74) *Attorney, Agent, or Firm* — ScienBiziP, P.C.

(57) ABSTRACT

A positioning system and a positioning method of tire pressure sensor and a vehicle are provided. The vehicle includes a plurality of wheels, each wheel is provided with a tire pressure sensor. The positioning system includes a plurality of positioning devices arranged in the vehicle, each positioning device is configured to receive a plurality of Bluetooth signals from the tire pressure sensors, and obtain a set of positioning data according to the Bluetooth signals; and a receiving device configured to determine a matching relationship between the tire pressure sensors and the wheels according to preset positions of the positioning devices and the sets of positioning data, to locate the tire pressure sensors on the vehicle.

9 Claims, 6 Drawing Sheets

POSITIONING SYSTEM AND POSITIONING METHOD OF TIRE PRESSURE SENSOR AND VEHICLE

CROSS-REFERENCE TO RELATED APPLICATIONS

This application claims priority to Chinese Patent Application No. 202410139580.6 filed on Jan. 31, 2024, filed in China National Intellectual Property Administration, the contents of which are incorporated by reference herein.

FIELD

The subject matter herein generally relates to vehicle technologies, and particularly to a positioning system and a positioning method of tire pressure sensor and vehicle.

BACKGROUND

Wheels of a vehicle are prone to blowout or failure due to various factors. Blowout or tire failure can easily lead to traffic accidents. In order to avoid such traffic accidents, which affects the driving safety of passers-by, the vehicle manufacturers install a tire pressure monitoring system (TPMS) on the vehicle before the vehicle leaves the factory. The tire pressure monitoring system includes tire pressure sensors and a receiver. The tire pressure sensors can detect a tire pressure and a temperature of each wheel of the vehicle so that the receiver can display the tire pressure and the temperature, and remind the driver of the vehicle when the tire pressure and/or the temperature are abnormal.

Each tire pressure sensor has an identity document (ID) for the receiver to pair the tire pressure sensor with the wheel, so as to identify which wheel is installed with which tire pressure sensor. When a wheel is damaged, it needs to be returned to the factory to repair the wheels and the tire pressure sensors one by one, which is time-consuming, labor-intensive, and increases costs.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
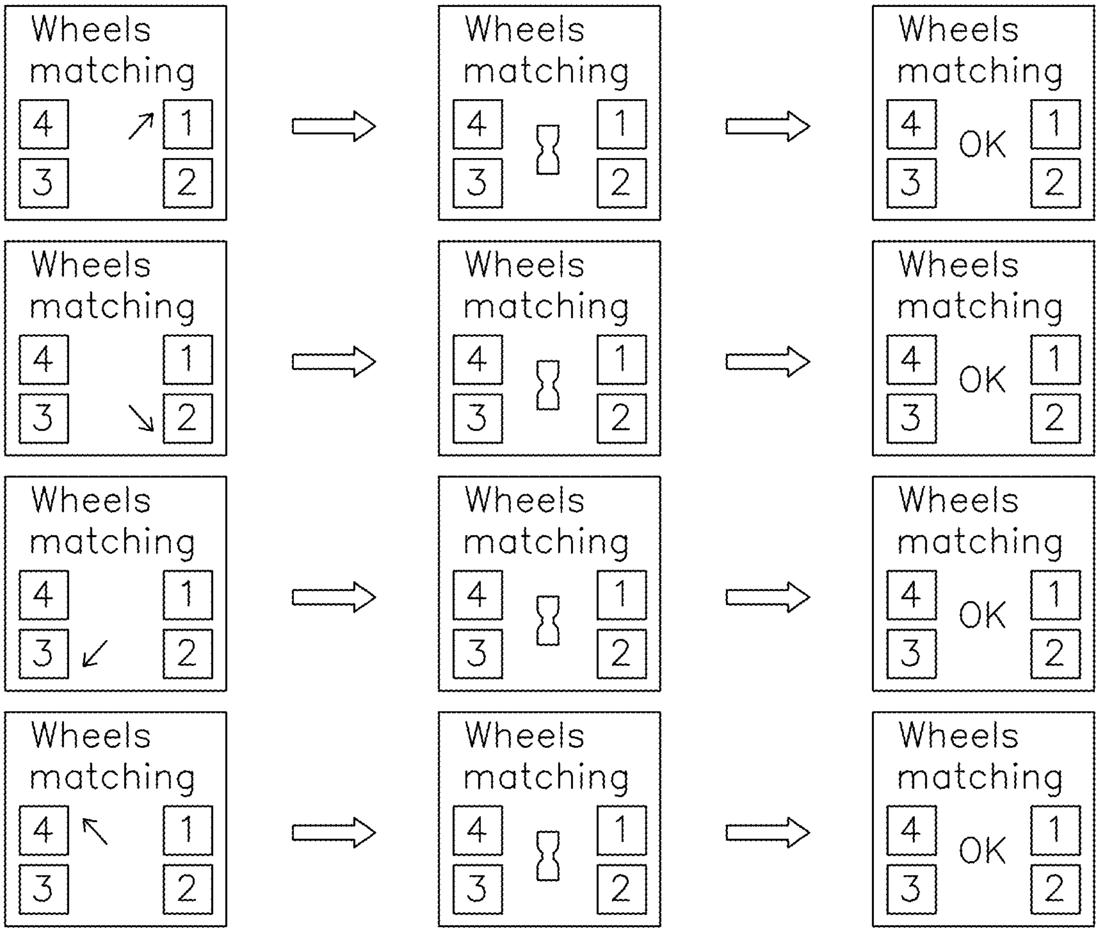
FIG. 1 (PRIOR ART)
FIG. 1 is a schematic diagram of an application scenario of the related technology.

In order to provide a clear understanding of the objects, features, and advantages of the present disclosure, the same are given with reference to the drawings and specific embodiments. It should be noted that non-conflicting embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art as generally understood. The terms used in the present disclosure are for the purposes of describing particular embodiments and are not intended to limit the present disclosure.

The present disclosure, referencing the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

The following is an explanation of the relevant technologies:

Tires of vehicles are prone to blowout or fall off due to various factors. For example, the weather is too hot, which can cause a tire blowout. The blowout or fall off can easily lead to a car accident. According to statistics, there have been 2,014 car accidents in a region caused by blowout or fall off in the past five years, resulting in a total of 42 deaths and 887 injuries. The grades of traffic accidents are divided into Class A1 (traffic accidents in which people die on the spot or within 24 hours of the accident are classified as Class A1), Class A2 (traffic accidents in which people are injured or die within 24 hours of the accident are classified as Class A2) and Class A3 (only property damage). There were 32 cases of A1, 529 cases of A2 and 1453 cases of A3. In order to avoid such accidents and affect the driving safety of passers-by, vehicle manufacturers will install tire pressure monitoring systems (TPMS) on vehicles before they leave the factory. The tire pressure monitoring system includes tire pressure sensors and a receiver. The tire pressure sensors can detect a tire pressure and a temperature of each wheel of the vehicle so that the receiver can display the tire pressure and the temperature, and remind the driver of the vehicle when the tire pressure and/or the temperature are abnormal.

Each tire pressure sensor has an identity document (ID) for the receiver to pair the tire pressure sensor with the wheel, so as to identify which wheel is installed with which tire pressure sensor. As shown in FIG. 1, when a wheel is damaged, it needs to be returned to the factory to re-pair the wheels and the tire pressure sensors one by one, which is time-consuming, labor-intensive, and increases costs.

In view of this, embodiments of the present application provide a positioning system and positioning method of tire pressure sensor, and a vehicle to locate a matching relationship between the tire pressure sensors and the wheels of the vehicle.

Figure 2:
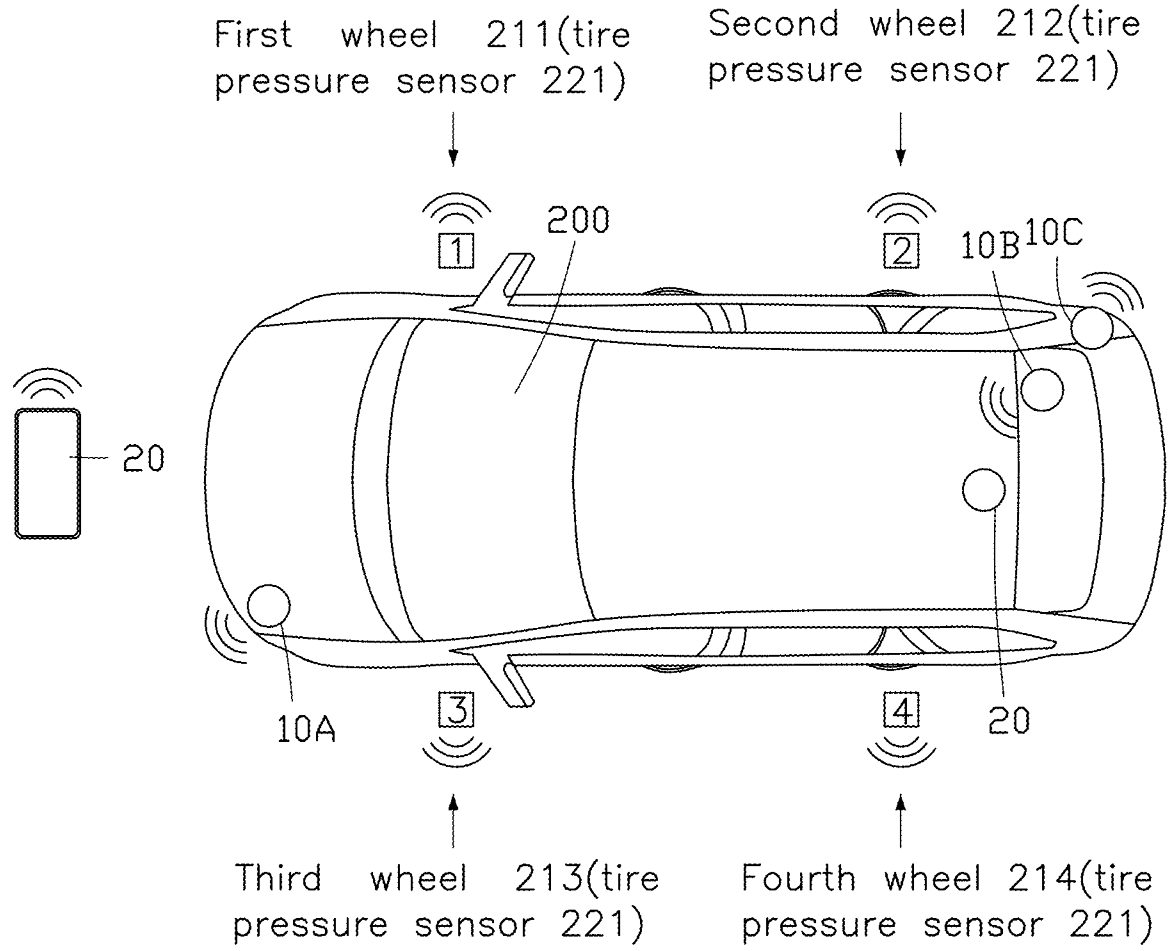
FIG. 2 is a schematic diagram of an application scenario of a positioning system of tire pressure sensor according to an embodiment of the present application.

Referring to FIG. 2, in an application scenario of the positioning system of tire pressure sensor of an embodiment of the present application, a vehicle 200 includes a first wheel 211, a second wheel 212, a third wheel 213, and a fourth wheel 214. Each wheel 210 is provided with a tire pressure sensor 221. Three positioning devices 10A, 10B, 10C of the positioning system 100 are arranged in the vehicle 200, each positioning device 10 receives Bluetooth signals sent by the four tire pressure sensors 221 with IDs #1, #2, #3 and #4, and obtains a set of positioning data according to the Bluetooth signals sent by the four tire pressure sensors 221 with IDs #1, #2, #3 and #4. Then, a receiving device 20 determines the matching relationship between the four tire pressure sensors 221 with IDs #1, #2, #3 and #4 and the first wheel 211, the second wheel 212, the third wheel 213 and the fourth wheel 214 respectively according to preset positions of the positioning devices 10A, 10B and 10C and each set of positioning data of each positioning device 10, thereby locating that the tire pressure sensor 221 with ID #1 is in the first wheel 211 of the vehicle 200, the tire pressure sensor 221 with ID #2 is in the second wheel 212 of the vehicle 200, the tire pressure sensor 221 with ID #3 is in the third wheel 213 of the vehicle 200, and the tire pressure sensor 221 with ID #4 is in the fourth wheel 214 of the vehicle 200.

Figure 3:
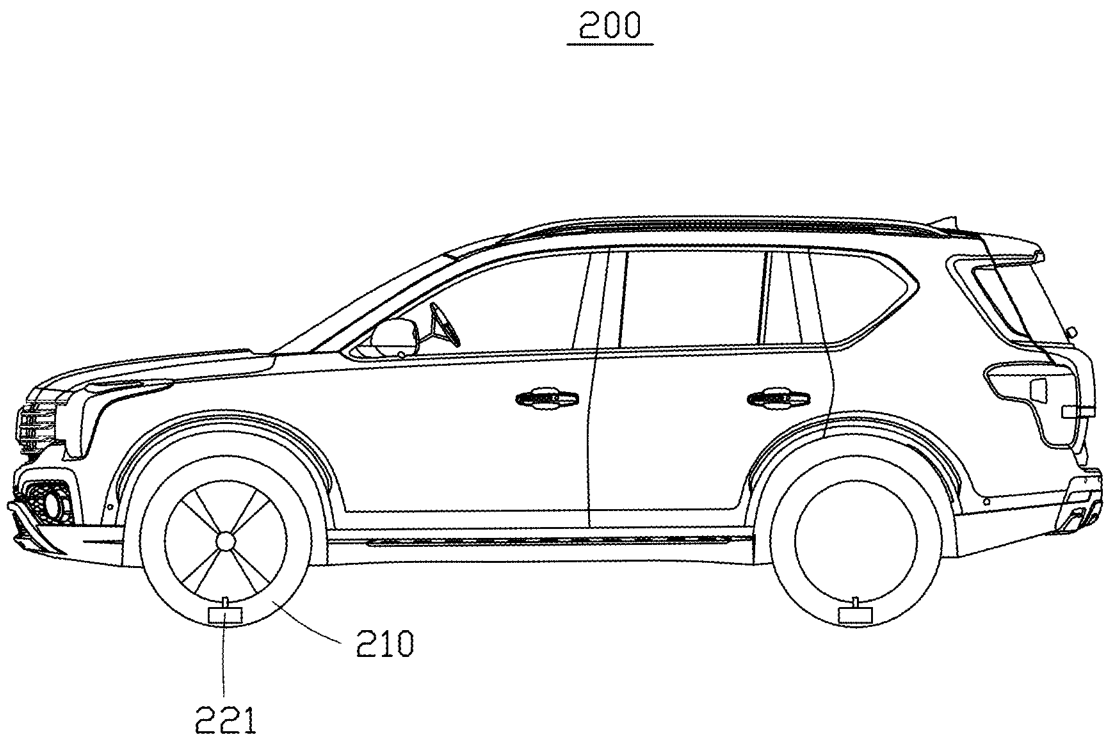
FIG. 3 is a schematic structural diagram of a vehicle according to an embodiment of the present application.
Figure 4:
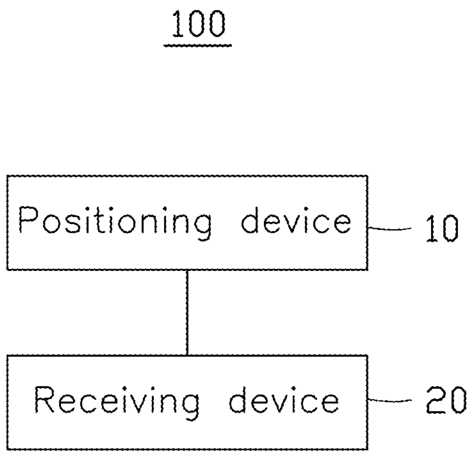
FIG. 4 is a schematic structural diagram of the positioning system of tire pressure sensor according to an embodiment of the present application.

Referring to FIGS. 2 to 4, in some embodiments, the vehicle 200 includes a plurality of wheels 210, each wheel 210 is provided with a tire pressure sensor 221. The tire pressure sensor 221 is used to detect tire pressure information and temperature information of the wheel 210. In one embodiment, the vehicle 200 includes four wheels 210, the wheel 210 under the passenger seat is the first wheel 211, and the wheel 210 in the same row with the first wheel 211 is the second wheel 212, the wheel 210 under the main driver's seat is the third wheel 213, and the wheel 210 in the same row with the third wheel 213 is the fourth wheel 214. The identity document (ID) of the tire pressure sensor 221 arranged in the first wheel 211 is #1, the ID of the tire pressure sensor 221 arranged in the second wheel 212 is #2, the ID of the tire pressure sensor 221 arranged in the third wheel 213 is #3, and the ID of the tire pressure sensor 221 arranged in the fourth wheel 214 is #4. The positioning system 100 of tire pressure sensor provided in the embodiment of the present application is applied to the vehicle 200.

The positioning system 100 includes a plurality of positioning devices 10 and one or more than two receiving devices 20, wherein the plurality refers to three or more. The positioning devices 10 and the receiving devices 20 establish wireless communication via Bluetooth communication technology. Each positioning device 10 also establishes wireless communication with the plurality of tire pressure sensors 221 through Bluetooth communication technology. That is, each positioning device 10 is used to receive Bluetooth signals sent by the plurality of tire pressure sensors 221. In one embodiment, the tire pressure sensor 221 sends a Bluetooth signal to the positioning device 10 after detecting changes in tire temperature information and/or tire pressure information.

Each positioning device 10 is configured to obtain a set of positioning data according to the plurality of Bluetooth signals. The set of positioning data includes a plurality of correspondences, each of which refers to a relationship between a calculated distance and the ID carried by a Bluetooth signal. The calculated distance refers to a distance between the tire pressure sensor 221 and the positioning device 10. In one example, one of the correspondences may be that the ID of the tire pressure sensor 221 closest to the calculated distance of the positioning device 10A is #3. Through the plurality of correspondences, the distances between the plurality of tire pressure sensors 221 and one positioning device 10 can be arranged.

Specifically, first, the positioning device 10 is used to parse a plurality of signal strength indicators of the plurality of Bluetooth signals. The strength of the Bluetooth signal is inversely proportional to the distance between the positioning device 10 and the tire pressure sensor 221, wherein the strength can be represented by a received signal strength indicator (RSSI).

The plurality of positioning devices 10 are respectively arranged in functional areas (or structural areas) of the vehicle 200 adjacent to different wheels 210, so that the strengths converted from the Bluetooth signals sent by the plurality of tire pressure sensors 221 received by each positioning device 10 are inconsistent. The structural areas of the vehicle 200 include a front fender area, a hood area, a door area, a body area, and a rear fender area, etc. In one example, the three positioning devices 10A, 10B, and 10C are provided in the vehicle 200. The positioning device 10A is provided in a hood adjacent to the third wheel 213, the positioning device 10B is provided in a body cover adjacent to the second wheel 212, and the positioning device 10C is provided in a rear fender adjacent to the second wheel 212.

The plurality of positioning devices 10 are respectively arranged in the structural areas adjacent to different wheels 210, and the distances between each positioning device 10 and the plurality of tire pressure sensors 221 of the vehicles 200 are different, and the strengths of the Bluetooth signals are also different.

Then, each positioning device 10 is also used to determine a plurality of calculated distances between the positioning device 10 and the tire pressure sensors 221 corresponding to the plurality of intensities indicated by the plurality of signal field strengths, and to determine a plurality of correspondences between the plurality of calculated distances and the plurality of IDs carried by the plurality of Bluetooth signals, and to obtain a set of positioning data based on the plurality of correspondences.

Figure 5A:
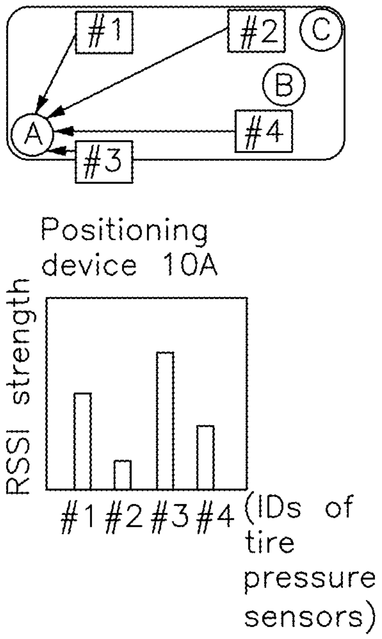
FIGS. 5A-5C are schematic diagrams of another application scenario of the positioning system of tire pressure sensor according to an embodiment of the present application.
Figure 5B:
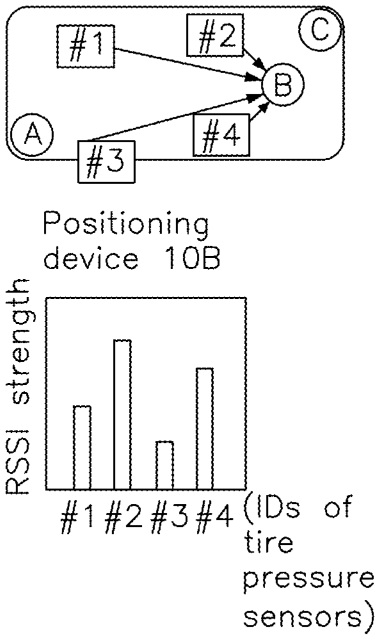
Figure 5C:
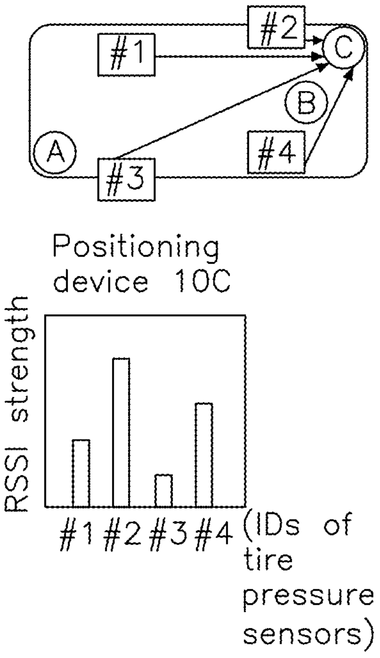

Referring to FIGS. 5A-5C, in one example, after the positioning device 10A receives the Bluetooth signals sent by the tire pressure sensor 221 with ID #1, the tire pressure sensor 221 with ID #2, the tire pressure sensor 221 with ID #3 and the tire pressure sensor 221 with ID #4, the strength of the tire pressure sensor 221 is converted according to the Bluetooth signal as shown in FIG. 5A. Objects caused by the strength from strong to weak are, in order, the tire pressure sensor 221 with ID #3, the tire pressure sensor 221 with ID #1, the tire pressure sensor 221 with ID #4 and the tire pressure sensor 221 with ID #2. Then, the positioning device 10A converts the plurality of calculated distances according to the strengths as shown in FIG. 5A, and the distance objects of the calculated distances from short to long are the tire pressure sensor 221 with ID #3, the tire pressure sensor 221 with ID #1, the tire pressure sensor 221 with ID #4, and the tire pressure sensor 221 with ID #2. In this way, the positioning data (the plurality of correspondences) of the positioning device 10A are that the distance objects of the calculated distances from short to long are the tire pressure sensor 221 with ID #3, the tire pressure sensor 221 with ID #1, the tire pressure sensor 221 with ID #4, and the tire pressure sensor 221 with ID #2.

Similarly, the strengths converted by the positioning device 10B is shown in FIG. 5B, and the strengths caused by the objects from strongest to weakest is the tire pressure sensor 221 with ID #2, the tire pressure sensor 221 with ID #4, the tire pressure sensor 221 with ID #1, and the tire pressure sensor 221 with ID #3. Then, the positioning device 10B converts the plurality of calculated distances according to the strengths as shown in FIG. 5B, and the distance objects of the calculated distances from shortest to longest are the tire pressure sensor 221 with ID #2, the tire pressure sensor 221 with ID #4, the tire pressure sensor 221 with ID #1, and the tire pressure sensor 221 with ID #3. The positioning data of the positioning device 10B is (the plurality of correspondences), and the distance objects of the calculated distances from shortest to longest are the tire pressure sensor 221 with ID #2, the tire pressure sensor 221 with ID #4, the tire pressure sensor 221 with ID #1, and the tire pressure sensor 221 with ID #3.

The strengths converted by the positioning device 10C is shown in FIG. 5C, and the strengths caused by the objects from strongest to weakest is the tire pressure sensor 221 with ID #2, the tire pressure sensor 221 with ID #4, the tire pressure sensor 221 with ID #1, and the tire pressure sensor 221 with ID #3. Then, the positioning device 10C converts the plurality of calculated distances according to the strengths as shown in FIG. 5C, and the distance objects of the calculated distances from shortest to longest are the tire pressure sensor 221 with ID #2, the tire pressure sensor 221 with ID #4, the tire pressure sensor 221 with ID #1, and the tire pressure sensor 221 with ID #3. The positioning data of the positioning device 10C is (the plurality of correspondences), and the distance objects of the calculated distances from shortest to longest are the tire pressure sensor 221 with ID #2, the tire pressure sensor 221 with ID #4, the tire pressure sensor 221 with ID #1, and the tire pressure sensor 221 with ID #3.

After each positioning device 10 receives the Bluetooth signals sent by the plurality of tire pressure sensors 221, it can determine the lengths of the plurality of calculated distances between the plurality of tire pressure sensors 221 and the positioning devices 10 based on the strengths of the signal field strength indication converted from the Bluetooth signals and the ID of the tire pressure sensor 221 carried by each Bluetooth signal.

The plurality of positioning devices 10 can convert the plurality of sets of positioning data according to the Bluetooth signals and send them to the receiving device 20 to assist the receiving device 20 in locating which wheels 210 of the vehicle 200 the tire pressure sensors 221 are on.

As shown in FIG. 2, the receiving device 20 can be disposed in the vehicle 200 or integrated into the key of the vehicle 200. The receiving device 20 is used to determine the matching relationship between the tire pressure sensors 221 and the wheels 210 according to the preset positions of the plurality of positioning devices 10 and the plurality of sets of positioning data of the plurality of positioning devices 10. The matching relationship is the relationship that the ID corresponding to each calculated distance is located at one wheel 210. The receiving device 20 stores the preset position of each positioning device 10 on the vehicle 200. The preset position refers to a mounting position of the positioning device 10, such as the engine hood adjacent to the third wheel 213, the body cover, and the rear fender adjacent to the second wheel 212 as mentioned above.

Specifically, the receiving device 20 is used to determine a set of matching relationship according to a correspondence between a preset position of a positioning device 10 and a set of positioning data.

In one example, referring to FIGS. 2 to 5, the preset position of the positioning device 10A is in the engine hood adjacent to the third wheel 213. A correspondence of the positioning data of the positioning device 10A indicates that the tire pressure sensor 221 with ID #3 is closest to the positioning device 10A in calculated distance, so it can be determined that the tire pressure sensor 221 with ID #3 may be set in the third wheel 213 (the tire pressure sensor 221 with ID #3 is set in the third wheel 213 as a set of matching relationship), and a correspondence indicates that the tire pressure sensor 221 with ID #1 is the second farthest from the positioning device 10A in calculated distance, so it can be determined that the tire pressure sensor 221 with ID #1 may be set in the first wheel 211 (the tire pressure sensor 221 with ID #1 is set in the first wheel 211 as a set of matching relationship), a correspondence indicates that the tire pressure sensor 221 with ID #4 is the third farthest from the positioning device 10A, then it can be determined that the tire pressure sensor 221 with ID #4 may be set in the fourth wheel 214 (determining that the tire pressure sensor 221 with ID #4 is set in the fourth wheel 214 as a set of matching relationship), a correspondence indicates that the tire pressure sensor 221 with ID #2 is the farthest from the positioning device 10A, then it is determined that the tire pressure sensor 221 with ID #2 may be set in the second wheel 212 (determining that the tire pressure sensor 221 with ID #2 is set in the second wheel 212 as a set of matching relationship).

Similarly, the positioning device 10A is in the vehicle body cover adjacent to the second wheel 212. A correspondence of the positioning data of the positioning device 10B indicates that the tire pressure sensor 221 with ID #2 is closest to the positioning device 10B in calculated distance, so it can be determined that the tire pressure sensor 221 with ID #2 may be set in the second wheel 212. A correspondence indicates that the tire pressure sensor 221 with ID #4 is the second farthest from the positioning device 10B in calculated distance, so it can be determined that the tire pressure sensor 221 with ID #4 may be set in the fourth wheel 214. A correspondence indicates that the tire pressure sensor 221 with ID #1 is the third farthest from the positioning device 10B, so it can be determined that the tire pressure sensor 221 with ID #1 may be set in the first wheel 211. And a correspondence indicates that the tire pressure sensor 221 with ID #3 is the farthest from the positioning device 10B, so it can be determined that the tire pressure sensor 221 with ID #3 may be set in the third wheel 213. Each set of matching relationship refers to the content of the previous paragraph.

The positioning device 10C is disposed in the rear fender adjacent to the second wheel 212. A correspondence of the positioning data of the positioning device 10C indicates that the tire pressure sensor 221 with ID #2 is closest to the positioning device 10C in calculated distance so it can be determined that the tire pressure sensor 221 with ID #2 may be arranged in the second wheel 212. A correspondence indicates that the tire pressure sensor 221 with ID #4 is the second farthest from the positioning device 10C, so it can be determined that the tire pressure sensor 221 with ID #4 may be set in the fourth wheel 214. A correspondence indicates that the tire pressure sensor 221 with ID #1 is the third farthest from the positioning device 10C, so it can be determined that the tire pressure sensor 221 with ID #1 may be set in the first wheel 211. And a correspondence indicates that the tire pressure sensor 221 with ID #3 is the farthest from the positioning device 10C, so it can be determined that the tire pressure sensor 221 with ID #3 may be set in the third wheel 213. Each set of matching relationship refers to the content of the previous paragraph.

Each set of positioning data can indicate the calculated distance between each positioning device 10 and the plurality of tire pressure sensors 221. Combined with the arrangement position of the positioning device 10 itself, the receiving device 20 can determine a set of matching relationship of which tire pressure sensor 221 is located on which wheel 210.

Then, the receiving device 20 is further used to count the plurality of sets of matching relationship obtained by the plurality of positioning devices 10 based on the plurality of positioning devices 10. In the counting or statistical results, it is determined that the set of matching relationship with the highest probability is the matching relationship between the tire pressure sensor 221 and the wheel 210.

For instance, the probability of the matching relationship (matching relationship means which the tire pressure sensor 221 is located on which wheel 210) between each group of tire pressure sensors 221 and the wheels 210 calculated by counting the positioning devices 10A, 10B and 10C is determined, and in the counting or statistical results, the matching relationship with the highest probability is determined as the final matching relationship. According to the counting or statistical results, the probability that the tire pressure sensor 221 with ID #1 is set in the first wheel 211 is 100%, the probability that the tire pressure sensor 221 with ID #2 is set in the second wheel 212 is 100%, the probability that the tire pressure sensor 221 with ID #3 is set in the third wheel 213 is 100%, and the probability that the tire pressure sensor 221 with ID #4 is set in the fourth wheel 214 is 100%. It can be finally determined that the tire pressure sensor 221 with ID #1 is set in the first wheel 211, the tire pressure sensor 221 with ID #2 is set in the second wheel 212, the tire pressure sensor 221 with ID #3 is set in the third wheel 213, and the tire pressure sensor 221 with ID #4 is set in the fourth wheel 214.

If only one positioning device 10 is used, since the Bluetooth signal sent by the tire pressure sensor 221 is prone to errors due to interference factors, it is likely that the strengths of the Bluetooth signals sent by the plurality of tire pressure sensors 221 received by the positioning device 10 are consistent. The positioning device 10 cannot locate which tire pressure sensor 221 is on which wheel 210. In the embodiment of the present application, the plurality of positioning devices 10 are used as a plurality of Bluetooth Low Energy Anchors (BLE Anchors) to generate the plurality of sets of positioning data. The receiving device 20 performs cross-validation through the plurality of sets of positioning data to further improve the accuracy of the matching relationship between multiple tire pressure sensors 221 and the plurality of wheels 210.

In the above technical solution, the plurality of positioning devices 10 are arranged on the vehicle 200, and each of the positioning devices 10 is used to receive the plurality of Bluetooth signals from the plurality of tire pressure sensors 221, and obtain the set of positioning data according to the plurality of Bluetooth signals. Then, the receiving device 20 can determine the matching relationship between the tire pressure sensors 221 and the wheels 210 according to the preset positions of the plurality of positioning devices 10 and the plurality of sets of positioning data, so as to locate the positions of the tire pressure sensors 221 on the vehicle 200.

Figure 6:
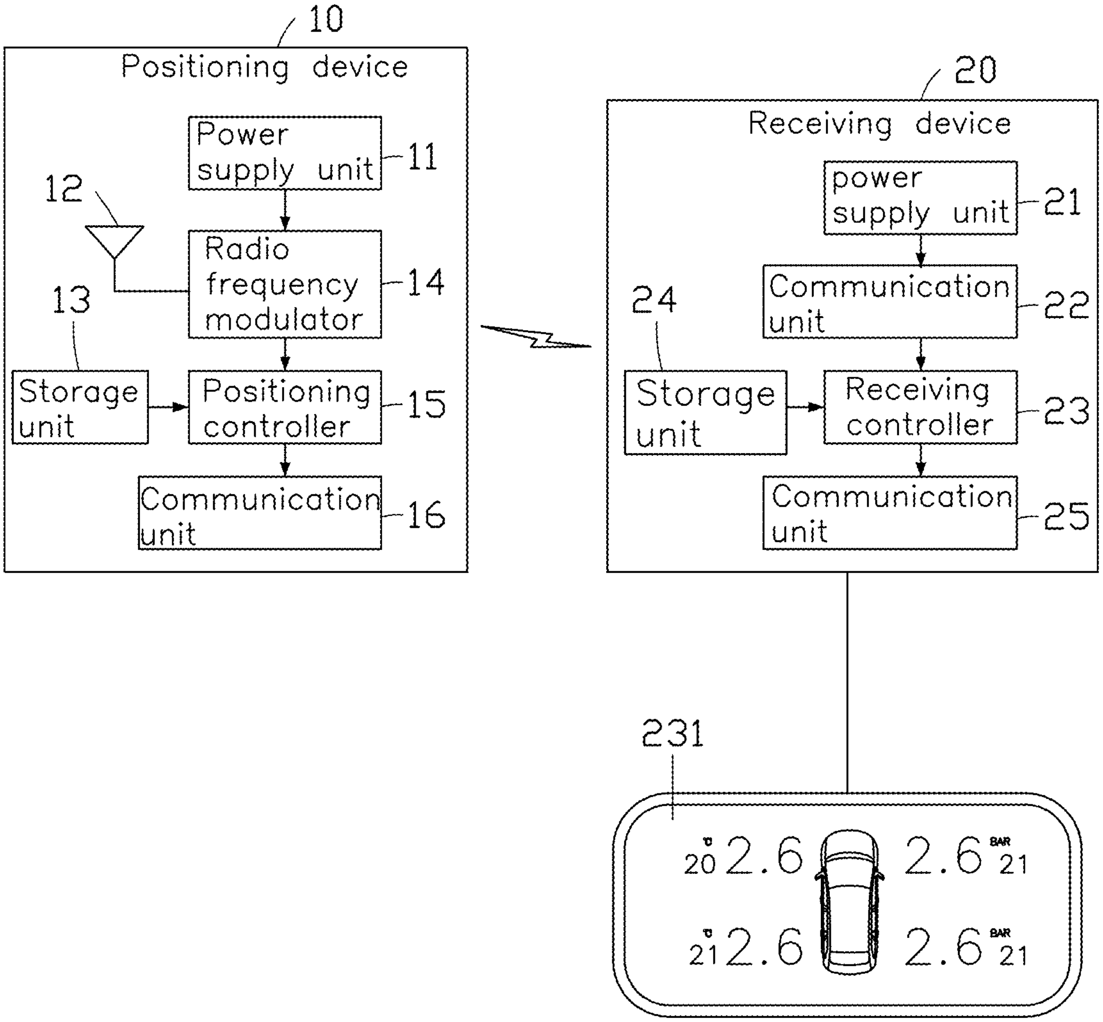
FIG. 6 is another schematic structural diagram of the positioning system of tire pressure sensor according to an embodiment of the present application.

In some embodiments, referring to FIG. 6, the positioning device 10 includes a power supply unit 11, an antenna 12, a storage unit 13, a radio frequency modulator 14, a positioning controller 15, and a communication unit 16. The power supply unit 11 is electrically connected to the antenna 12, the radio frequency modulator 14, the positioning controller 15, and the communication unit 16, respectively, and the power supply unit 11 is used to provide power to the antenna 12, the radio frequency (RF) modulator 14, the positioning controller 15, and the communication unit 16. The antenna 12 is electrically connected to the RF modulator 14, and the antenna 12 is used to receive the Bluetooth signals sent from the tire pressure sensors 221, and send the Bluetooth signals to the RF modulator 14. The RF modulator 14 is electrically connected to the positioning controller 15. The RF modulator 14 is used to convert frequencies of the Bluetooth signals from high frequencies to base frequencies, thereby converting high-frequency Bluetooth signals that are conducive to propagation into base-frequency Bluetooth signals that are conducive to processing by the positioning controller 15.

The positioning controller 15 is used to parse out a plurality of signal field strength indications of the plurality of base frequency Bluetooth signals, and determine the plurality of calculated distances between the positioning devices 10 and the tire pressure sensors 221 corresponding to the plurality of strengths according to the plurality of strengths of the plurality of signal field strength indications. The positioning controller 15 is also used to determine the plurality of correspondences between the plurality of calculated distances and the plurality of IDs carried by the plurality of Bluetooth signals, and obtain the set of positioning data according to the plurality of correspondences. The positioning controller 15 can be a MCU (Microcontroller Unit, MCU) chip. The positioning controller 15 is also electrically connected to the communication unit 16, and the communication unit 16 is used to send the positioning data to the receiving device 20. The storage unit 13 is electrically connected to the positioning controller 15, and the storage unit 13 is used to store programs or data, so that the positioning controller 15 can realize the functions of the positioning controller 15 by running or executing the programs stored in the storage unit 13 and invoking the data stored in the storage unit 13.

In some embodiments, the receiving device 20 includes a power supply unit 21, a communication unit 22, a receiving controller 23, a storage unit 24, and a communication unit 25. The power supply unit 21 is electrically connected to the communication unit 22, the receiving controller 23, and the storage unit 24, respectively, and the power supply unit 21 is used to provide power for the communication units 22 and 25, the receiving controller 23, and the storage unit 24. The communication unit 22 is electrically connected to the receiving controller 23, and the communication unit 22 is used to receive the positioning data sent by the communication unit 16 of the positioning device 10, and send the positioning data to the receiving controller 23. The receiving controller 23 is used to determine the set of matching relationship based on the correspondence between the preset position of the positioning device 10 and the set of positioning data. The receiving controller 23 is also used to count the plurality of sets of matching relationship based on multiple positioning devices 10. The receiving controller 23 is also used to determine that the set of matching relationship with the highest probability is the matching relationship between the tire pressure sensors 221 and the wheels 210 in the counting or statistical results. The receiving controller 23 is also electrically connected to the communication unit 25, and the communication unit 25 is used to send the matching relationship between the tire pressure sensors 221 and the wheels 210 to the display unit 231 of the vehicle 200. So that the display unit 231 of the vehicle 200 displays the positioning information of which tire pressure sensor 221 is located at which wheel 210. The Bluetooth signals also carry the temperature information and the tire pressure information of the wheels 210 sent by the tire pressure sensors 221. That is, the positioning data also includes the temperature information and the tire pressure information. After locating the tire pressure sensors 221 at the position of the vehicle 200, the receiving device 20 can also send the temperature information and the tire pressure information to the display unit 231.

The storage unit 24 is electrically connected to the receiving controller 23. The storage unit 24 is used to store programs or data so that the receiving controller 23 can realize the functions of the receiving controller 23 by running or executing the programs stored in the storage unit 24 and invoking the data stored in the storage unit 24.

The present application also provides a positioning method of tire pressure sensor, which is applied to the positioning system 100 of tire pressure sensor. The positioning system 100 includes the positioning device 10 and the receiving device 20. The positioning method includes the following steps:

At block S101, each of the positioning devices receives a plurality of Bluetooth signals from the plurality of tire pressure sensors and obtains a set of positioning data according to the plurality of Bluetooth signals.

At block S102: the receiving device determines a matching relationship between the tire pressure sensors and the wheels according to the preset positions of the plurality of positioning devices and the plurality of sets of positioning data, so as to locate the positions of the tire pressure sensors on the vehicle.

In some embodiments, the positioning device 10 includes the radio frequency modulator 14 and the positioning controller 15. The positioning device 10 receives the plurality of Bluetooth signals from the plurality of tire pressure sensors, and obtains the set of positioning data according to the plurality of Bluetooth signals, including the following steps:

At block S201, the radio frequency modulator converts frequencies of the plurality of Bluetooth signals from high frequencies to base frequencies;

At block S202: the positioning controller parses a plurality of signal field strength indications of a plurality of base frequency Bluetooth signals;

At block S203: determining a plurality of calculated distances between the positioning devices and the tire pressure sensors corresponding to a plurality of strengths of the plurality of signal field strength indications according to the plurality of strengths; and At block S204: determining a plurality of correspondences between the plurality of calculated distances and a plurality of IDs carried by the plurality of Bluetooth signals, and obtain the set of positioning data according to the plurality of correspondences.

In some embodiments, the receiving device determines the matching relationship between the tire pressure sensors and the wheels according to the preset positions of the plurality of positioning devices and the plurality of sets of positioning data, including the following steps:

At block S301, determining a set of matching relationship according to a correspondence between a preset position of the positioning device and a set of positioning data.

At block S302: counting a plurality of sets of matching relationship based on the plurality of positioning devices;

At block S303: in a counting result, determining one of the plurality of sets of matching relationship with the highest probability to be the matching relationship between the tire pressure sensors and the wheels.

In some embodiments, the receiving device sends the matching relationship between the tire pressure sensors and the wheels to the display unit of the vehicle.

The present application also provides a vehicle 200, which is provided with the positioning system 100 of tire pressure sensor.

The above description only describes embodiments of the present disclosure, and is not intended to limit the present disclosure, various modifications and changes can be made to the present disclosure. Any modifications, equivalent substitutions, improvements, etc. made within the spirit and scope of the present disclosure are intended to be included within the scope of the present disclosure.

What is claimed is:

1. A positioning system of tire pressure sensor applied in a vehicle, the vehicle comprising a plurality of wheels, each of the plurality of wheels provided with a tire pressure sensor, the positioning system comprising:

a plurality of positioning devices arranged in the vehicle, each of the plurality of positioning devices configured to receive a plurality of Bluetooth signals from the plurality of tire pressure sensors, and obtain a set of positioning data according to the plurality of Bluetooth signals; and a receiving device configured to determine a matching relationship between the plurality of tire pressure sensors and the plurality of wheels according to preset positions of the plurality of positioning devices and the plurality of sets of positioning data, to locate the plurality of tire pressure sensors on the vehicle;

wherein each of the plurality of positioning devices comprises a radio frequency (RF) modulator and a positioning controller, the RF modulator is configured to convert frequencies of the plurality of Bluetooth signals from high frequencies to base frequencies;

the positioning controller is configured to parse a plurality of signal field strength indications of the plurality of Bluetooth signals of the base frequencies;

the positioning controller is further configured to determine a plurality of calculated distances between the plurality of positioning devices and the plurality of tire pressure sensors corresponding to a plurality of strengths of the plurality of signal field strength indications according to the plurality of strengths; and the positioning controller is further configured to determine a plurality of correspondences between the plurality of calculated distances and a plurality of identity documents carried by the plurality of Bluetooth signals, and obtain the set of positioning data according to the plurality of correspondences;

wherein the receiving device is further configured to:

determine a set of matching relationship according to one of the plurality of correspondences between one of the preset positions of the plurality of positioning devices and one of the plurality of sets of positioning data, the one of plurality of correspondences is a relationship that one of the plurality of identity documents corresponding to each of the plurality of calculated distances is located on one of the plurality of wheels;

count a plurality of sets of matching relationship based on the plurality of positioning devices; and in a counting result, determine one of the plurality of sets of matching relationship with the highest probability to be the matching relationship between the plurality of tire pressure sensors and the plurality of wheels.

2. The positioning system of tire pressure sensor according to claim 1, wherein the receiving device is further configured to send the matching relationship between the plurality of tire pressure sensors and the plurality of wheels to a display unit of the vehicle.

3. The positioning system of tire pressure sensor according to claim 1, wherein the plurality of positioning devices is respectively arranged in structural areas of the vehicle adjacent to the plurality of wheels.

4. A vehicle comprising:

a plurality of wheels, each of the plurality of wheels is provided with a tire pressure sensor; and a positioning system of tire pressure sensor comprising:

a plurality of positioning devices arranged in the vehicle, each of the plurality of positioning devices configured to receive a plurality of Bluetooth signals from the plurality of tire pressure sensors, and obtain a set of positioning data according to the plurality of Bluetooth signals; and a receiving device configured to determine a matching relationship between the plurality of tire pressure sensors and the plurality of wheels according to preset positions of the plurality of positioning devices and the plurality of sets of positioning data, to locate the plurality of tire pressure sensors on the vehicle;

wherein each of the plurality of positioning devices comprises a radio frequency (RF) modulator and a positioning controller, the RF modulator is configured to convert frequencies of the plurality of Bluetooth signals from high frequencies to base frequencies;

the positioning controller is configured to parse a plurality of signal field strength indications of the plurality of Bluetooth signals of the base frequencies;

the positioning controller is further configured to determine a plurality of calculated distances between the plurality of positioning devices and the plurality of tire pressure sensors corresponding to a plurality of strengths of the plurality of signal field strength indications according to the plurality of strengths; and the positioning controller is further configured to determine a plurality of correspondences between the plurality of calculated distances and a plurality of identity documents carried by the plurality of Bluetooth signals, and obtain the set of positioning data according to the plurality of correspondences;

wherein the receiving device is further configured to:

determine a set of matching relationship according to one of the plurality of correspondences between one of the preset positions of the plurality of positioning devices and one of the plurality of sets of positioning data, the one of plurality of correspondences is a relationship that one of the plurality of identity documents corresponding to each of the plurality of calculated distances is located on one of the plurality of wheels;

count a plurality of sets of matching relationship based on the plurality of positioning devices;

in a counting result, determine one of the plurality of sets of matching relationship with the highest probability to be the matching relationship between the plurality of tire pressure sensors and the plurality of wheels.

5. The vehicle according to claim 4, wherein the receiving device is further configured to send the matching relationship between the plurality of tire pressure sensors and the plurality of wheels to a display unit of the vehicle.

6. The vehicle according to claim 4, wherein the plurality of positioning devices is respectively arranged in structural areas of the vehicle adjacent to the plurality of wheels.

7. A positioning method of tire pressure sensor applied in a positioning system of tire pressure sensor applied in a vehicle, the vehicle comprising a plurality of wheels, each of the plurality of wheels provided with a tire pressure sensor, the positioning system comprising a plurality of positioning devices and a receiving device, the positioning method comprising:

receiving a plurality of Bluetooth signals from the plurality of tire pressure sensors, and obtaining a set of positioning data according to the plurality of Bluetooth signals by each of the plurality of positioning devices; and determining a matching relationship between the plurality of tire pressure sensors and the plurality of wheels according to preset positions of the plurality of positioning devices and the plurality of sets of positioning data, to locate the plurality of tire pressure sensors on the vehicle by the receiving device;

wherein each of the plurality of positioning devices comprises a radio frequency (RF) modulator and a positioning controller, receiving a plurality of Bluetooth signals from the plurality of tire pressure sensors, and obtaining a set of positioning data according to the plurality of Bluetooth signals by each of the plurality of positioning devices comprises:

converting frequencies of the plurality of Bluetooth signals from high frequencies to base frequencies by the RF modulator;

parsing a plurality of signal field strength indications of the plurality of Bluetooth signals of the base frequencies by the positioning controller;

determining a plurality of calculated distances between the plurality of positioning devices and the plurality of tire pressure sensors corresponding to a plurality of strengths of the plurality of signal field strength indications according to the plurality of strengths by the positioning controller; and determining a plurality of correspondences between the plurality of calculated distances and a plurality of identity documents carried by the plurality of Bluetooth signals, and obtaining the set of positioning data according to the plurality of correspondences by the positioning controller;

wherein determining the matching relationship between the plurality of tire pressure sensors and the plurality of wheels according to the preset positions of the plurality of positioning devices and the plurality of sets of positioning data by the receiving device comprises:

determining a set of matching relationship according to one of the plurality of correspondences between one of the preset positions of the plurality of positioning devices and one of the plurality of sets of positioning data, the one of plurality of correspondences is a relationship that one of the plurality of identity documents corresponding to each of the plurality of calculated distances is located on one of the plurality of wheels;

counting a plurality of sets of matching relationship based on the plurality of positioning devices; and in a counting result, determining one of the plurality of sets of matching relationship with the highest probability to be the matching relationship between the plurality of tire pressure sensors and the plurality of wheels.

8. The positioning method of tire pressure sensor according to claim 7, further comprising:

sending the matching relationship between the plurality of tire pressure sensors and the plurality of wheels to a display unit of the vehicle by the receiving device.

9. The positioning method of tire pressure sensor according to claim 7, wherein the plurality of positioning devices is respectively arranged in structural areas of the vehicle adjacent to the plurality of wheels.

* * * * *